United States Patent
Ryu et al.

(10) Patent No.: US 8,720,404 B2
(45) Date of Patent: May 13, 2014

(54) BALANCE SHAFT ASSEMBLY FOR VEHICLE

(75) Inventors: Sungyup Ryu, Hwaseong-si (KR);
Byungchul Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/524,242

(22) Filed: Jun. 15, 2012

(65) Prior Publication Data

US 2013/0098327 A1  Apr. 25, 2013

(30) Foreign Application Priority Data

Oct. 20, 2011  (KR) ........................ 10-2011-0107421

(51) Int. Cl.
*F02B 75/06*  (2006.01)

(52) U.S. Cl.
USPC ................. 123/192.2; 123/196 R; 123/195 C

(58) Field of Classification Search
USPC ................. 123/192.2, 196 R, 195 C; 254/33; 184/6.5
See application file for complete search history.

(56) References Cited

U.S. PATENT DOCUMENTS

| | | | | |
|---|---|---|---|---|
| 6,371,071 | B1 * | 4/2002 | Iwata .......................... | 123/192.2 |
| 8,020,528 | B1 * | 9/2011 | Phillips et al. ............. | 123/192.2 |
| 2010/0147248 | A1 * | 6/2010 | Neal ........................... | 123/192.2 |

FOREIGN PATENT DOCUMENTS

| | | |
|---|---|---|
| JP | 6-17879 A | 1/1994 |
| JP | 2006-258046 A | 9/2006 |
| JP | 2006-329064 A | 12/2006 |
| JP | 2007-23902 A | 2/2007 |
| JP | 2007-24188 A | 2/2007 |
| JP | 2008-111452 A | 5/2008 |
| JP | 2009-144639 A | 7/2009 |
| KR | 90-17270 U | 10/1990 |
| KR | 2003-0075027 A | 9/2003 |
| KR | 10-2004-0015574 A | 2/2004 |
| KR | 10-2004-0110103 A | 12/2004 |
| KR | 10-2011-0029603 A | 3/2011 |

* cited by examiner

*Primary Examiner* — Lindsay Low
*Assistant Examiner* — Omar Morales
(74) *Attorney, Agent, or Firm* — Morgan, Lewis & Bockius LLP

(57) ABSTRACT

A balance shaft assembly for a vehicle, which includes a balance shaft carrier disposed under a cylinder block and, includes an oil pan, an upper end of the oil pan being coupled to a bottom of the cylinder block, may include a balance shaft protruding rearward from the balance shaft carrier and rotatably supported by the balance shaft carrier, a balance weight formed on an outer circumferential surface of the balance shaft, and a balance weight receiving portion formed at the oil pan and coupled to the balance shaft carrier to seal the balance weight therebetween.

3 Claims, 3 Drawing Sheets

BALANCE SHAFT ASSEMBLY FOR VEHICLE

CROSS-REFERENCE TO RELATED APPLICATIONS

The present application claims priority to Korean Patent Application Number 10-2011-0107421 filed Oct. 20, 2011, the entire contents of which application is incorporated herein for all purposes by this reference.

BACKGROUND OF THE INVENTION

1. Field of the Invention

The present invention relates to a balance shaft assembly for a vehicle, and more particularly, to a balance shaft assembly for a vehicle in which a rear cover of a balance housing is integrally formed in an oil pan.

2. Description of Related Art

In general, a balance shaft assembly is disposed to reduce vibration generated while an engine operates. In the balance shaft assembly, a driven gear is connected with a crankshaft pulley by a power transmission belt, and a balance shaft coupled with the driven gear attenuates vibration of an engine while rotating at the same or double speed in the same or opposite direction with the crankshaft during the operation of the engine.

As shown in FIG. 1, a balance shaft assembly is coupled to the bottom of a cylinder block 2 by a plurality of fasteners (not shown), such as bolts, with the lower portion inside an oil pan 1.

That is, the balance shaft assembly is additionally disposed between cylinder block 2 and oil pan 1, but the thickness of a housing (not shown) of the balance shaft assembly or oil pan 1 and a gap therebetween are added by adding the balance shaft assembly to the existing layout, such that it is difficult to ensure the ground clearance of a vehicle.

There may be interference between the parts P, such as pipes and connecting members, since a space therebetween is narrow while the housing of the balance shaft assembly is mounted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a balance shaft assembly for a vehicle which can prevent interference between the parts under an oil pan and a balance shaft housing.

Various aspects of the present invention are directed to providing a balance shaft assembly for a vehicle that makes it possible to mount a balance shaft without changing the design of the ground clearance of a vehicle.

In an aspect of the present invention, a balance shaft assembly for a vehicle, which may include a balance shaft carrier disposed under a cylinder block and, may include an oil pan, an upper end of the oil pan being coupled to a bottom of the cylinder block, may include a balance shaft protruding rearward from the balance shaft carrier and rotatably supported by the balance shaft carrier, a balance weight formed on an outer circumferential surface of the balance shaft, and a balance weight receiving portion formed at the oil pan and coupled to the balance shaft carrier to seal the balance weight therebetween.

The balance shaft carrier may include a balance weight cover formed at a lateral side thereof and disposed above the balance weight to cover an upper portion of the balance weight, wherein the balance weight receiving portion is formed on a bottom portion inside the oil pan, and wherein the balance weight cover contacts the balance weight receiving portion to enclose the balance weight therebetween to seal the balance weight.

The balance weight cover may have coupling grooves recessed upward.

The balance weight receiving portion may have coupling protrusions protruding forward to be fitted in the coupling grooves.

The coupling grooves are formed in a semicircular shape.

The balance shaft carrier may include a lower coupling protrusion under the balance weight and the oil pan may include a coupling step to which the lower coupling protrusion of the balance shaft carrier is engaged.

The oil pan may further include a receiving groove formed between the coupling protrusions and the coupling step to receive the balance weight thereon.

The oil pan may further include an oil screen for filtering foreign substances in oil.

According to a balance shaft assembly for a vehicle of the present invention, it is possible to prevent damage due to interference between the parts under the oil pan of the balance shaft housing.

Further, it is possible to ensure the ground clearance of a vehicle of at least 6 mm.

In addition, it is possible to minimize changes in the layout of the related art.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
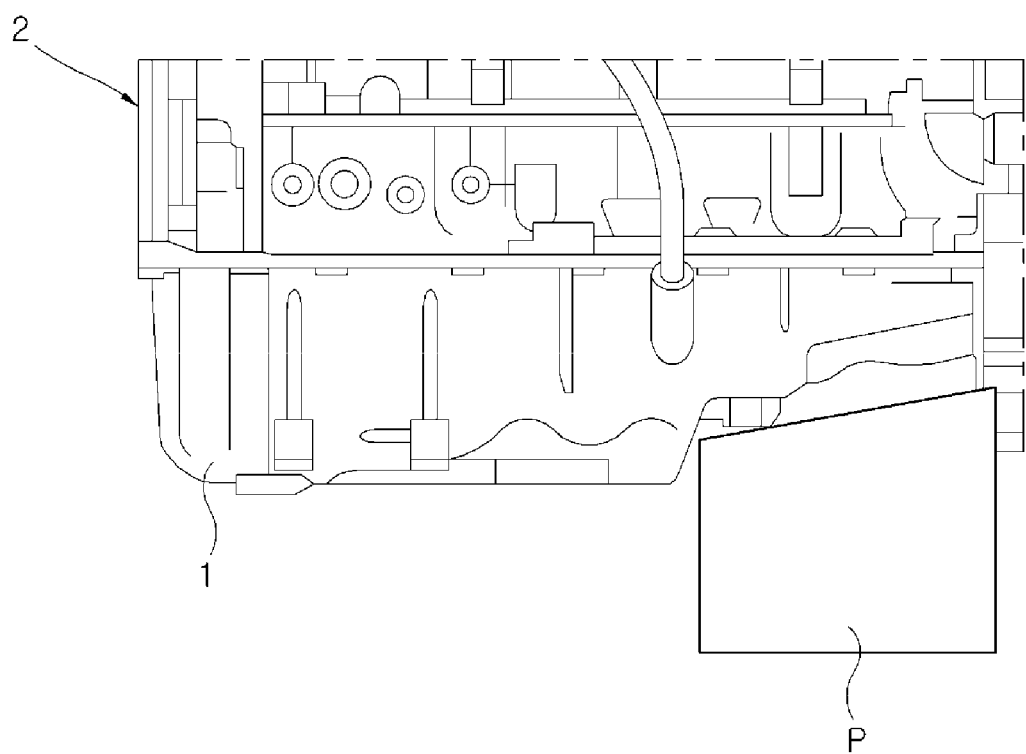
FIG. 1 is a view showing when a balance shaft assembly for a vehicle according to the related art is mounted.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter in detail with reference to the accompanying drawings.

Figure 2:
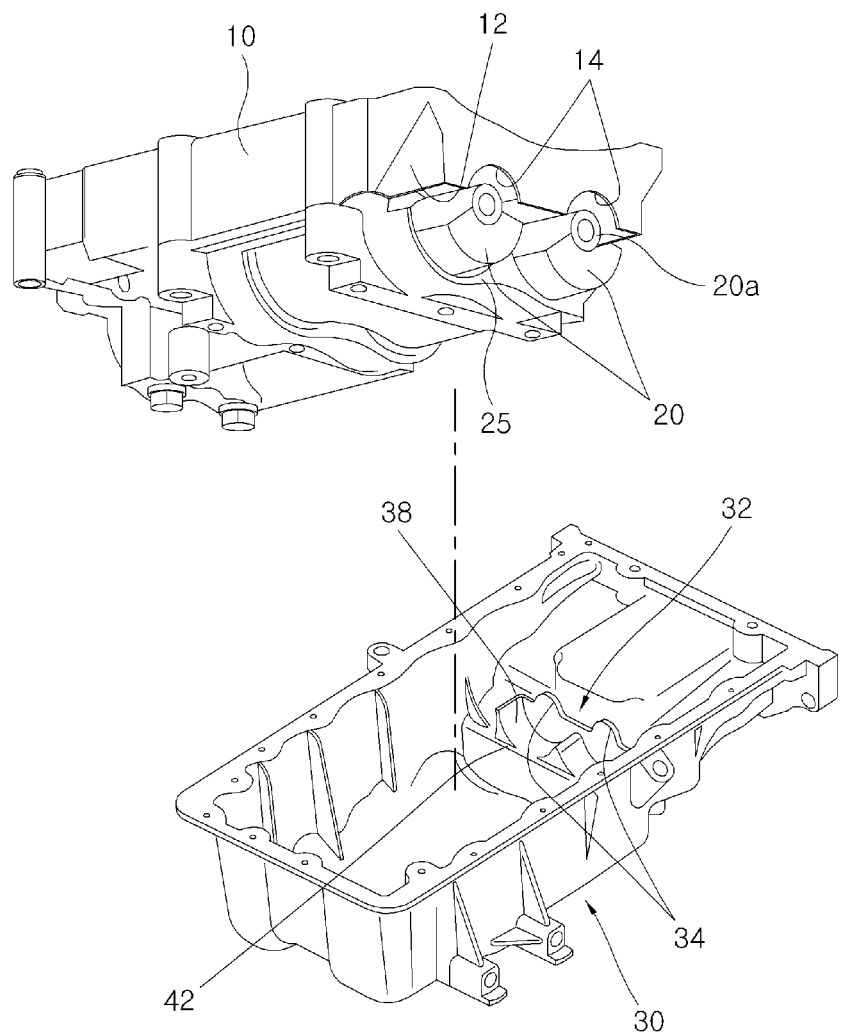
FIG. 2 is a perspective view showing a state that a balance shaft assembly for a vehicle according to an exemplary embodiment of the present invention is not mounted.

FIG. 2 is a perspective view showing when a balance shaft assembly for a vehicle according to an exemplary embodiment of the present invention is not mounted. As shown in the figure, the balance shaft assembly for a vehicle according to an exemplary embodiment of the present invention includes a balance shaft carrier 10 mounted on the lower portion of a cylinder block and an oil pan 30 coupled to the lower portion of balance shaft carrier 10.

The balance shaft carrier 10 is combined with the cylinder block shown in FIG. 1 by a plurality of fasteners in such a state that an upper edge of the balance shaft carrier 10 is contacted to the bottom of the cylinder block.

The balance shaft assembly includes a balance shaft 20a rotatably disposed longitudinally through balance shaft carrier 10 and a balance weight 20 disposed ahead of a driven gear coupled to the front end of balance shaft 20a, which is disposed through the balance shaft carrier 10, by a fastener, such as a sink key.

That is, it is preferable that journals are disposed at the front and rear portion in the balance shaft carrier 10 to support the outer circumferential surface of balance shaft 20a and balance shaft 20a is mounted on the journals to be rotatable above balance shaft carrier 10.

The balance weight 20 formed on the outer circumferential surface of the balance shaft 20a is provided with a driving force by rotation of a crank pulley which transmits a driving force of the driven gear and an engine, in which the balance is kept by rotation of balance weight 20, thereby attenuate vibration.

A balance weight cover 12 covering balance weight 20 is formed at a predetermined distance above a rotational path of balance weight 20.

Balance weight cover 12 is shaped to cover the upper portion of balance weight 20 at a predetermined distance and coupling grooves 14 are formed upward at a side of balance weight cover 12.

Coupling grooves 14 are fitted on coupling protrusions 34, which are described below, to cover the upper portion of balance weight 20 together with balance weight cover 12, and have a shape with an internal space separating the balance weight 20 from the outside. Further, lateral surfaces of the balance weight cover 12 may have polygonal or circular sides.

Meanwhile, a balance weight receiving portion 32 is formed on the bottom inside an oil pan 30 to receive the balance weight 20. The balance weight receiving portion 32 includes a receiving groove 38 formed on a lower portion of the oil pan 30. Hereby, the coupling protrusions 34 are formed at the balance weight receiving portion 32 to be fitted in the coupling grooves 14.

That is, the balance weight receiving portion 32 is employed so that it is possible to support the balance weight 20 when the balance weight receiving portion 32 is contacted to the balance weight cover 12 and the balance weight 20 is disposed on the receiving groove 38.

The balance weight cover 12 and balance weight receiving portion 32 may be made of metal.

And the coupling protrusions 34 are formed upward at the balance weight receiving portion 32. The coupling protrusions 34 are formed to be in close contact with the coupling grooves 14.

That is, any shape may be possible as long as the coupling protrusions 34 come in contact, along the circular shapes of coupling grooves 14.

In an exemplary embodiment of the present invention, the balance shaft carrier 10 may include a lower coupling protrusion 25 under the balance weight 20 and the oil pan 30 may include a coupling step 42 behind the receiving groove 38. When the balance shaft carrier 10 is coupled to the oil pan 30, the lower coupling protrusion 25 and the coupling groove 14 may be engaged to the coupling step 42 and the coupling protrusion 34 to prevent lubricant oil in the oil pan 30 from leaking out of a gap between the balance shaft carrier 10 and the oil pan 30.

Figure 3:
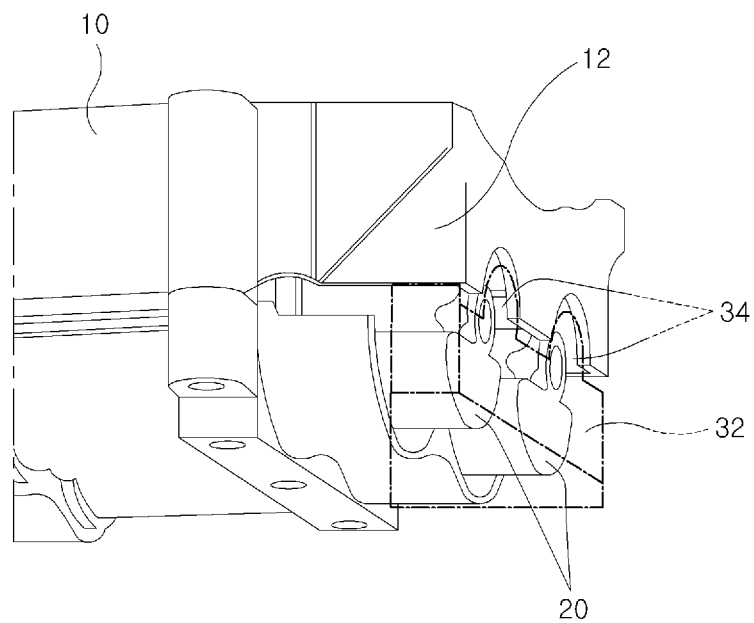
FIG. 3 is a perspective view showing a state that a balance shaft cover and a balance weight receiving portion are combined with the balance shaft assembly for a vehicle according to an exemplary embodiment of the present invention.

FIG. 3 is a perspective view showing a state that a balance shaft cover and a balance weight receiving portion are combined with the balance shaft assembly for a vehicle according to an exemplary embodiment of the present invention. As shown in the figure, when the oil pan 30 is combined with the balance shaft carrier 10 mounted on the cylinder block, the balance weight 20 formed at the end of the balance shaft 20a is positioned in the balance weight receiving portion 32 with the balance weight cover 12 and the balance weight receiving portion 32 in contact. In this state, the coupling grooves 14 of the balance weight cover 12 are fitted on the coupling protrusions 34 of the balance weight receiving portion 32, such that the balance weight 20 is positioned in the internal space.

Therefore, a front cover for protecting the front side balance weight 20 or a rear cover for protecting the rear side of the balance weight 20 in the related art can be omitted, such that it is possible to ensure the ground clearance in the layout, as much as the thickness (about 6 mm) and the gap of the balance weight housing.

An oil screen facing the inside of the oil pan 30 may be further included. The oil screen is mounted at the intake end of an oil intake port and prevents foreign substances from flowing into an oil circulation system by filtering the foreign substances in oil.

Although exemplary embodiments of the present invention are described above, the present invention is not limited thereto and all of modifications that are considered as being easily changed from the exemplary embodiments by those skilled in the art to the equivalent to the present invention are included.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A balance shaft assembly for a vehicle, which includes a balance shaft carrier disposed under a cylinder block and, includes an oil pan, an upper end of the oil pan being coupled to a bottom of the cylinder block, the balance shaft assembly comprising:
   a balance shaft protruding rearward from the balance shaft carrier and rotatably supported by the balance shaft carrier;
   a balance weight formed on an outer circumferential surface of the balance shaft; and
   a balance weight receiving portion formed at the oil pan and coupled to the balance shaft carrier to seal the balance weight therebetween;
   wherein the balance shaft carrier includes:
      a balance weight cover that is formed at a lateral side of the balance shaft, has coupling grooves formed in a substantially semicircular shape and recessed upward, is disposed above the balance weight to cover an upper portion of the balance weight and contacts the balance weight receiving portion to enclose the balance weight therebetween to seal the balance weight; and
      a lower coupling protrusion under the balance weight;
   wherein the balance weight receiving portion is formed on a bottom portion inside the oil pan and has coupling protrusions protruding upward to be fitted in the coupling grooves of the balance weight cover; and
   wherein the oil pan includes a coupling step behind the coupling protrusions for engaging with the lower coupling protrusion of the balance shaft carrier.

2. The balance shaft assembly as defined in claim 1, wherein the oil pan further includes a receiving groove formed between the coupling protrusions and the coupling step to receive the balance weight thereon.

3. The balance shaft assembly as defined in claim 1, wherein the oil pan further includes an oil screen for filtering foreign substances in oil.

* * * * *